March 8, 1949.  W. W. GIBSON  2,463,864
AIRFOIL

Filed May 5, 1944  2 Sheets-Sheet 1

INVENTOR
William W. Gibson
BY
ATTORNEYS.

WITNESS:

March 8, 1949. W. W. GIBSON 2,463,864
AIRFOIL
Filed May 5, 1944 2 Sheets-Sheet 2

WITNESS:
Robt R Mitchel.

INVENTOR
William W. Gibson
BY
Brown & Harding
ATTORNEYS.

Patented Mar. 8, 1949

2,463,864

UNITED STATES PATENT OFFICE 2,463,864

AIRFOIL

William W. Gibson, New York, N. Y., assignor to Inventors, Inc., Detroit, Mich., a corporation of Michigan Application May 5, 1944, Serial No. 534,206

3 Claims. (Cl. 244—40)

This invention relates to an improvement in airfoil, such, for example, as an airplane wing, a propeller blade, and the like.

As is well known, when an airfoil, as an airplane wing, is moved through the air, the flow of air from the leading edge of the airfoil over and under the upper and lower surfaces of the airfoil exerts a lifting effect, the major portion of which is exerted on the upper surface.

The flow of air with respect to the surfaces of the airfoil, the form of which is such that effective lift is obtained, is, however, not without a certain degree of negative effect upon the airfoil. Thus, a drag or resistance to the forward movement of the airfoil is set up by a swirl of stagnant air occurring adjacent the upper surface in an area to the rear of the peak of the camber of the airfoil. Again, swirl with consequent drag occurs at the trailing edge of the airfoil.

Now, it is the object of this invention to provide an airfoil so constructed as to minimize drag; and, more particularly, so constructed as to utilize air moving relative to the airfoil in its forward movement to eliminate, or at least greatly minimize, swirl and vacuum, as they tend to occur in the forward movement of the airfoil, with consequent reduction in drag upon and increase in the efficiency of the airfoil.

Having now indicated, in a general way, the nature and purpose of this invention, I will proceed to a detailed description of a preferred embodiment thereof, with reference to the accompanying drawings, in which.

Figure 1:
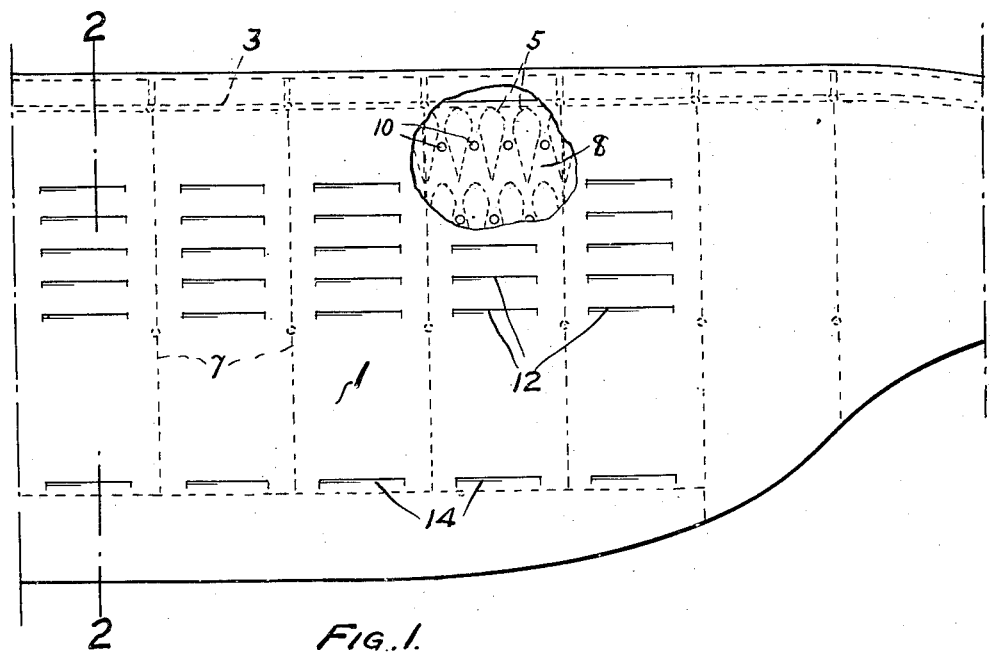
Figure 1 is a plan view, partly broken away, of a section of an airplane wing embodying this invention.

In the several figures 1 indicates the upper surface covering of an airplane wing, 2 indicates the lower surface covering, the surface coverings being supported on a frame 3, and the wing being provided with a flap 4. The wing may be of any desired design and the frame and surface coverings may be designed and constructed of materials as may be desired consistent with the particular structure of the wing according to this invention. It should be noted, however, that coverings 1 and 2 both have two faces which are separated by a substantial distance by supporting framework as shown in Figure 1. Towards the trailing edge the distance separating the faces is gradually reduced until the faces are together without separating framework.

Figure 5:
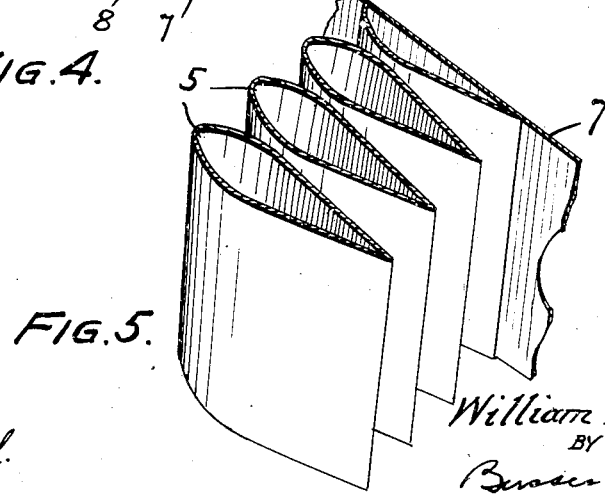
Figure 5 is a perspective view, partly in section and partly broken away, showing a detail of construction.

Within the wing and supported on the inner face of the lower surface covering 2 are a series of hollow members 5 of ovoid or tear-drop form, shown in detail in Figure 5.

The members 5 are arranged in spaced relation in a plurality of lines or ranks extending longitudinally of the wing from its root or adjacent its root toward its tip, the front line or rank being adjacent to the leading edge of the wing. The number of lines of the members 5 chordwise of the wing will depend on the chord, the particular design and camber of the wing and the length of the major axis of the members. Generally speaking, the members 5 will extend chordwise of the wing substantially to the rear of the peak of the camber.

Figure 4:
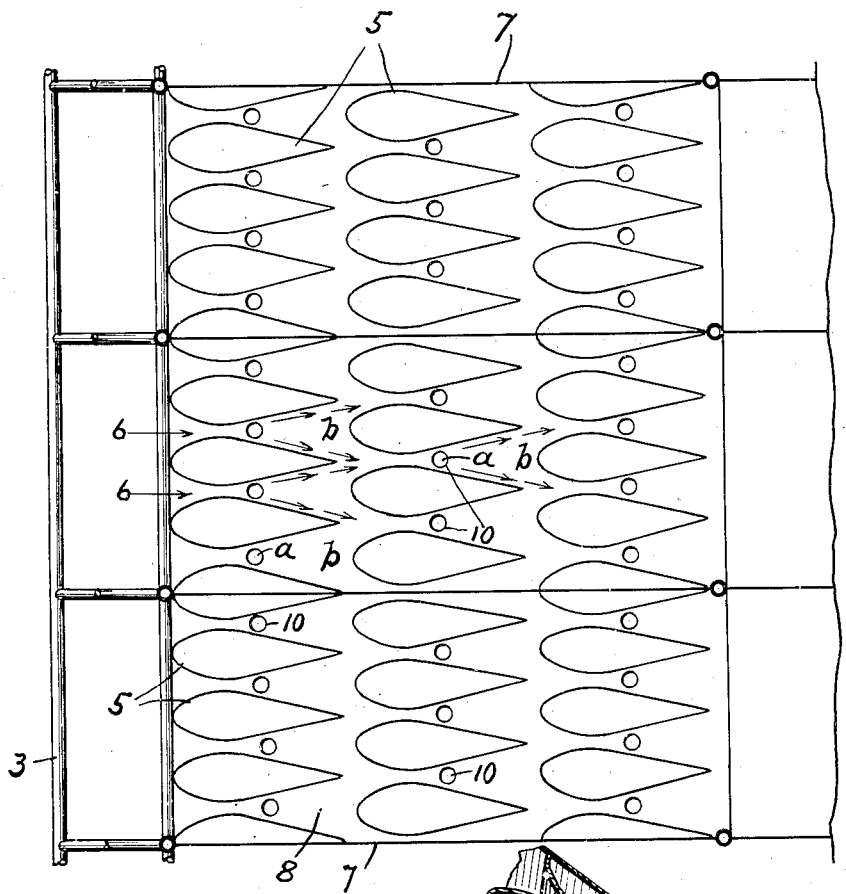
Figure 4 is a view on line 4—4, Figure 2.

The members 5 in the lines extending longitudinally of the wing or positioned relatively so as to form Venturi passages 6 between them; and the members of the respective lines are staggered so that the Venturi passages formed by respective lines of members 5 will be staggered with respect to the Venturi passages formed by adjacent lines of member 5, as shown in Figure 4.

The members 5 are enclosed by the lower surface covering 2, end closures 7, 7 at the ends of the lines and a cover 8. Openings 9 are formed in the leading edge of the wing for the entrance of air to the Venturi passages 6.

Figure 2:
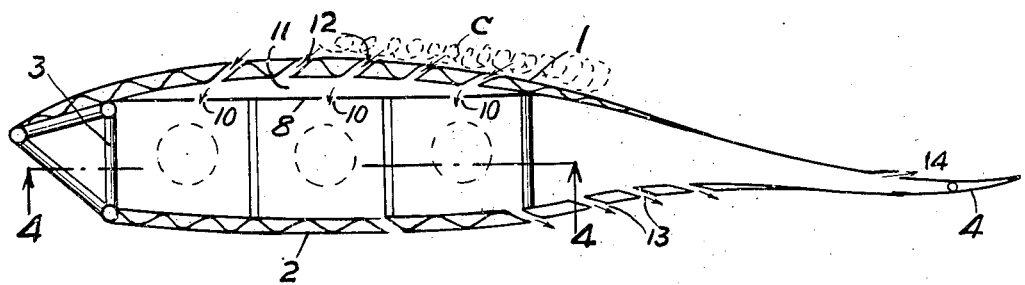
Figure 2 is a view on line 2—2, Figure 1.
Figure 3:
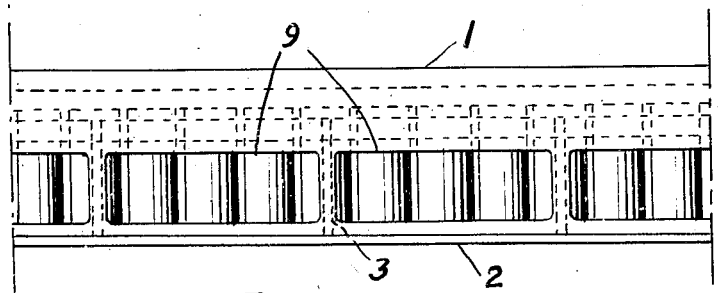
Figure 3 is a front view of the section of the wing shown in Figure 1 showing details of construction of the leading edge of the wing.

The cover 8, which is provided with openings 10 directly above the areas a in the Venturi passages, in which air passing through the passages has attained a high velocity, forms with the upper surface covering 1 a chamber 11; and a series of passages 12 extend forwardly at an angle through the upper surface covering 1 and open into the chamber 11, as shown in Figure 2. The passages 12 are arranged in lines longitudinally and chordwise of the wing, as shown in Figure 1.

In the lower surface covering 2, in the rear portion of the wing, are formed passages 13, which open into the interior of the wing and extend at an angle rearwardly. And lines of passages 14, opening into the interior of the wing and extending forwardly, are formed in the upper covering 1 of the wing adjacent to the trailing edge of the wing, or, as shown in Figure 1, adjacent the line of connection of the flap 4 to the wing.

As will be appreciated, for any given airfoil, the size, exact location and number of the Venturi passages 6, formed by the members 5, and of the openings 9 in the leading edge, and the size, number, angle of extension and exact location and angle of extension of the several series of passages 12, 13 and 14 in the upper and lower surfaces will depend upon the size and precise design of any given airfoil. However, these data will be readily figured for an airfoil of given size and design by those skilled in the art in the light of the following description of the function of the structure described.

When an airfoil constructed in accordance with this invention, as exemplified in the above description, is moved forward, air will flow over its upper and lower surfaces with consequent lifting effect. At the same time, air will enter the Venturi passages 6, formed between the forward line of members 5, through the openings 9 in the leading edge. In passing through the forward set of Venturi passages the velocity of the air will be greatly increased in the areas a, and as the velocity drops in the areas b, the air streams will be split by the next line of members 5 and will pass through the next set of Venturi passages formed by the next line of members 5, and likewise through the rear set of Venturi passages as the air travels chordwise of the airfoil.

The passage of air through the successive sets of Venturi passages will, especially in the areas a of high velocity, act to draw air from the chamber 11 through openings 10, in cover 8, which, it will be noted, are positioned directly above the areas a, thus tending to create a vacuum in chamber 11. The tendency toward a vacuum thus created in chamber 11 will cause air from adjacent the outer surface of the upper surface covering 1 of the airfoil to pass into chamber 11 through the passages 12. Since the passages 12 are located in the area where air passing relative to the upper surface of the airfoil tends to swirl, as indicated by dotted lines c, Figure 2, and in which there may be some stagnation of the air, the downdraft through the passages 12 will break up or negative swirl and effect a smooth flow of air over the surface intermediate the passages. As a result, drag in such area will be reduced and the efficiency of the airfoil in such area will be greatly increased, despite the loss of some surface to the slot area.

The air passing through the Venturi passages will finally be discharged from the wing at a relatively high velocity, partly through the passages 13 in the lower surface covering of the airfoil and partly through the passages 14 adjacent to the trailing edge or the line of attachment of the flap 4.

The air discharged through the passages 13 will act to satisfy any tendency toward a vacuum in the area into which they discharge and hence will be effective to reduce drag.

Finally, the air discharged through the passages 14 will negative trailing edge swirl and act to reduce trailing edge drag.

It will be appreciated that the above detailed description of an embodiment of my invention for illustrative purposes is not intended to be limiting upon the scope of this invention, it being obvious that various modifications in detail may be made without departing from the scope of the claims appended hereto.

What I claim and desire to protect by Letters Patent is:

1. An airfoil having upper and lower surfaces and leading and trailing edges, openings in the leading edge for the admission of air to the interior of the airfoil, a plurality of ovoid members arranged longitudinally and in staggered relation chordwise within the airfoil and forming therebetween a series of Venturi passages positioned to receive air admitted through the openings in the leading edge of the airfoil, means forming a chamber above said Venturi passages and provided with openings positioned to afford communication between said chamber and said passages, through the upper surface of the airfoil a slanting passage having its top closer to the trailing edge than its bottom is and opening into said chamber, said passage through the upper surface being in the area in which air passing over the airfoil tends to swirl, and through the lower surface of the airfoil a slanting passage having its bottom closer to the trailing edge than its top is and communicating with the interior of the airfoil to the rear of the Venturi passages, said passages in the lower surface of the airfoil being in the area in which the forward movement of the airfoil tends to create a vacuum.

2. An airfoil having upper and lower surfaces and leading and trailing edges, openings in the leading edge for the admission of air to the interior of the airfoil, a plurality of ovoid members arranged longitudinally and in staggered relation chordwise within the airfoil and forming therebetween a series of Venturi passages positioned to receive air admitted through the openings in the leading edge of the airfoil, means forming a chamber above said Venturi passages and provided with openings positioned to afford communication between said chamber and said passages, through the upper surface of the airfoil a slanting passage having its top closer to the trailing edge than its bottom is and opening into said chamber, said passage through the upper surface being in the area in which air passing over the airfoil tends to swirl, and in the upper surface of the airfoil adjacent to the trailing edge openings in the area of trailing edge swirl communicating with the interior of the airfoil to the rear of said Venturi passages.

3. An airfoil having upper and lower surfaces and leading and trailing edges, openings in the leading edge for the admission of air to the interior of the airfoil, a plurality of ovoid members arranged longitudinally and in staggered relation chordwise within the airfoil and forming therebetween a series of Venturi passages positioned to receive air admitted through the openings in the leading edge of the airfoil, means forming a chamber above said Venturi passages and provided with openings positioned to afford communication between said chamber and said passages, through the upper surface of the airfoil a slanting passage having its top closer to the trailing edge than its bottom is and opening into said chamber, said passage through the upper surface being in the area in which air passing over the airfoil tends to swirl, through the lower surface of the airfoil a slanting passage having its bottom closer to the trailing edge than its top is and communicating with the interior of the airfoil to the rear of the Venturi passages, said passage in the lower surface of the airfoil being in the area in which the forward movement of the airfoil tends to create a vacuum and in the upper surface of the airfoil adjacent to the trailing edge openings in the area of trailing edge swirl.

WILLIAM W. GIBSON.

REFERENCES CITED

The following references are of record in the file of this patent:

UNITED STATES PATENTS

| Number | Name | Date |
|---|---|---|
| 1,530,635 | Adams | Mar. 24, 1925 |
| 1,852,086 | Mittelstaedt | Apr. 5, 1932 |
| 2,136,403 | Vance et al. | Nov. 15, 1938 |
| 1,513,241 | Harding | Oct. 28, 1941 |